TEMPERATURE COMPENSATED SEMICONDUCTOR RESISTOR

Filed Oct. 27, 1961

2 Sheets-Sheet 1

INVENTORS
LLOYD P. HUNTER
JOSEPH F. WOODS

BY Alvin J. Riddles
ATTORNEY

IMPURITY LEVELS IN GERMANIUM

IMPURITY LEVELS IN SILICON

United States Patent Office 3,248,677
Patented Apr. 26, 1966

3,248,677

TEMPERATURE COMPENSATED SEMICONDUCTOR RESISTOR

Lloyd P. Hunter, Poughkeepsie, and Joseph F. Woods, Yorktown Heights, N.Y., assignors to International Business Machines Corporation, New York, N.Y., a corporation of New York

Filed Oct. 27, 1961, Ser. No. 148,075
12 Claims. (Cl. 338—7)

This invention relates to electrical impedances; and, in particular, to the use of semiconductor material as a resistive electrical impedance.

Conventional resistive materials have specific resistivities lower than those attainable in germanium and other semiconductors. In order to achieve desired resistances, the normal devices are usually made in the form of long, thin wires or deposited as thin films. In the second of these forms the surface to bulk ratio is large; hence, an ambient can affect resistance value and aging effects may occur. In the first form, devices tend to be bulky. The high resistivity of semiconductor materials permits the manufacture of solid chunk resistors whose properties are unaffected by an ambient. In addition, with the art of microminiaturization, it is becoming of increasing value to be able to make different types of electrical components from the same material. The use of semiconductor material, in accordance with the invention, for resistive impedances permits; in addition to superior temperature performance, the formation in microminiature circuits of resistive impedances in the same crystalline body employed for the active elements of the circuit, such as the transistors.

Semiconductor material, thus far available in the art, has exhibited highly sensitive changes in resistive impedance with changes in temperature. The physical mechanisms that have been set forth explaining these changes have been very involved and have indicated that resistivity changes in semiconductor materials have been dependent on a number of interdependent non-linear factors. As a source of background, a discussion of the physics of conduction in semiconductor materials is set forth in the well-known texts in the art:

"Handbook of Semiconductor Electronics" by Lloyd P. P. Hunter, McGraw-Hill Company, Inc., 1956, pages 2–1 to 2–14.

and

"An Introduction to Semiconductors" by W. Crawford Dunlap, Jr., John Wiley & Sons, Inc., 1957, pages 65–69.

What has been discovered is that the predominant one of all the parameters influencing the variation of resistivity of semiconductor material with temperature in the normal temperature range of device operation may be compensated by enhancing an opposite effect in the semiconductor material. In accordance with the invention, the compensation is accomplished by providing a temperature dependent increase in carrier concentration which serves to compensate for a temperature dependent decrease in carrier mobility and thereby to impart uniform, temperature-independent, resistive properties to a quantity of semiconductor material.

It is a primary object of this invention to provide a new material for resistive impedances.

It is another object of this invention to provide a semiconductor body with temperature-independent resistive properties.

It is another object of this invention to provide a method of imparting temperature-independence of resistive properties to a semiconductor body.

It is another object of this invention to provide semiconductor material which internally compensates for varying parameters which affect resistivity as temperature changes.

It is another object of this invention to impart temperature-independent resistive properties of semiconductor material.

It is another object of this invention to provide a method of compensating in semiconductor material for a variation in carrier mobility.

The foregoing and other objects, features and advantages of the invention will be apparent from the following more particular description of a preferred embodiment of the invention, as illustrated in the accompanying drawings.

Figure 1:
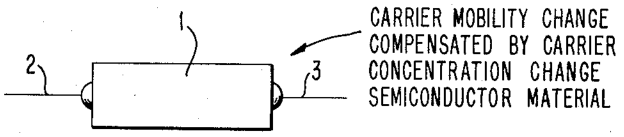
FIG. 1 is a schematic view of a body of semiconductor material suitable for use as a resistive component in a circuit.

Semiconductor material in either single crystalline or polycrystalline form in the standard resistivities employed in the art has characteristically exhibited strong temperature dependence of resistivity in the range of temperatures around room temperature, which most applications in circuitry would require.

The temperature dependence of resistivity has been due predominantly to a carrier mobility change in the semiconductor material. This parameter tends to decrease with temperature increase and has the effect of raising the resistivity. The decrease in carrier mobility is non-linear and varies approximately as $T^{-2}$. Another parameter affecting the resistivity performance of semiconductor material is that of thermally generated carriers. The increase in thermally generated carriers is non-linear and in the intrinsic conduction range (in which carrier concentration is controlled by impurities) varies approximately as:

$$\frac{1}{1+e^{\frac{E_D-E_f}{kT}}}$$

where:

$E_f$=energy of Fermi level
$E_D$=activation energy level of the impurity
$k$=Boltzman's constant in ev. per deg.
$T$=temperature in degrees Kelvin This parameter tends to decrease resistivity with temperature increase.

Under normal operating conditions, the parameters of semiconductor material are so selected that thermally generated carriers do not appreciably affect resistivity, but, by proper selection of specific impurities and concentrations, thermally generated carriers can be caused to play a significant compensating role in the mechanism of conduction.

It has been found, in accordance with the invention, that these parameters, although the effects caused by their variation are governed by different non-linear expressions, may be combined in a scemiconductor body, and that in combination they may satisfactorily compensate the effect of each other over a desired temperature range.

Further, in accordance with the invention, the compensation is provided by the introduction into the semiconductor body of a quantity of special impurities that provide an additional source of thermally generated carriers.

The semiconductor body may be in mono or polycrystalline form although in the polycrystalline form, it will be apparent to one skilled in the art that added resistance will be present as a result of reduced effective mobility due to intercrystalline barriers.

The impurities in semiconductor material generally have energy states that lie somewhere between the valence and conduction band energy levels of the host semiconductor material with the impurities, characteristically known in the art as "shallow donors," occupying energy levels adjacent to the conduction band energy level, and the impurities, characteristically known in the art as "shallow acceptors," occupying energy levels adjacent the valence band energy level. The special impurities employed, in accordance with the invention, are those known in the art as "deep level' impurities. These impurities occupy energy levels that are deeper than those of the characteristic donor and acceptor impurities. The depth of the energy level of a particular impurity is the energy separation between its energy level and that of the nearest adjacent band edge energy level. "Deep level" impurities have been employed in the semiconductor art to provide selected effects, and one example of a selected effect is in U.S. Patent No. 2,871,427; wherein abnormal sensitivity to temperature is imparted through the use of the impurity iron (Fe).

In accordance with the invention, selected "deep level" impurities are introduced into an impurity laden semiconductor body having a particular resistivity. As a temperature variation occurs this source of thermally generated additional carriers operates to provide an increase in carrier concentration which compensates for a decrease in carrier mobility within the body as the temperature increases. Semiconductor material exhibiting these compensated parameters will exhibit temperature-independent resistance properties over a selected temperature range.

Referring now to FIG. 1, a body of "carrier mobility change" compensated by "carrier concentration change" semiconductor material 1 is schematically shown provided with ohmic contacts 2 and 3, respectively, for circuit connection purposes well-known in the art. As has been previously mentioned, it is the resistive electrical properties of the body 1 that is the subject of the invention, and the body 1 may take any shape convenient to the electrical function performed, including being part of the body of another semiconductor device. The body 1 is of a semiconductor material that has the effect of its carrier mobility variation with temperature compensated by the effect of its carrier concentration variation with temperature. The body 1 is of semiconductor material; for example, germanium or silicon, exhibiting an appreciable band energy gap and having a first carrier concentration $N_1$ for a resistivity value and an additional concentration $N_2$ of a selected "deep level" impurity for compensation. The two concentrations $N_1$ and $N_2$ and the specific "deep level" impurity are chosen, in accordance with the invention, to give the desired resistivity and to maintain that resistivity over a range of temperature changes by compensating for the decrease in the mobility of carriers within the body 1 by an increase in carrier concentration due to thermally generated carriers from the deep level impurities.

Figure 2:
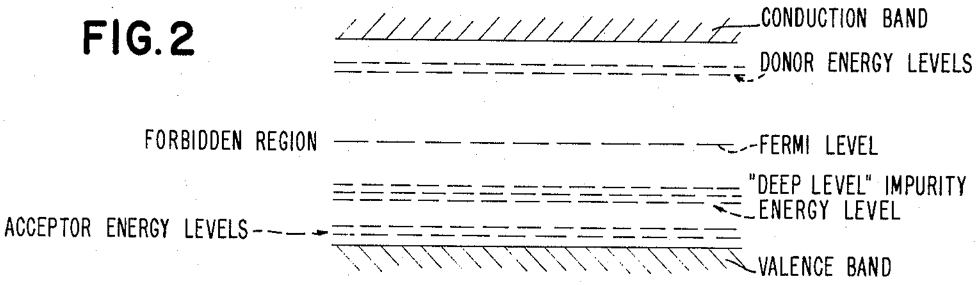
FIG. 2 is an energy level diagram illustrating the relationship of the impurity levels introduced, in accordance with the invention, with the band energy structure of the semiconductor material.

Referring next to FIG. 2, there is shown a schematic diagram illustrating the various energy levels in a semiconductor host material. In FIG. 2, the valence and conduction bands of the host semiconductor material; for example, germanium or silicon, are shown separated by a forbidden energy gap. For the material germanium, this gap width is approximately 0.67 electron volt at room temperature; and, for the material silicon, it is approximately 1.12 electron volts at room temperature. Many of the intermetallic semiconductor compounds, currently receiving study in the art, have forbidden energy gap values greater, less than and between those of germanium and silicon.

The characteristic donor and acceptor energy levels are shown adjacent to the conduction and valence band energy levels, respectively. These impurity levels are separated from their adjacent band energy levels by approximately 0.01 electron volt in germanium.

The "deep level" impurity energy level is shown between the Fermi level and the valence band and more "deeply" separated from its adjacent (valence) band energy level than the characteristic acceptor impurity energy levels. While the "deep" impurity level has been illustrated in FIG. 2 as on the valence band side of the Fermi level, this is done for illustration purposes only for, as will be apparent to one skilled in the art, the value of the "deep level" impurity energy level required for purposes of the invention to provide the additional source of carriers at desired temperatures governs the selection of the particular "deep level" impurity and the "deep level" energy level may lie anywhere within the forbidden region between the characteristic donor and acceptor impurities.

Figure 3:
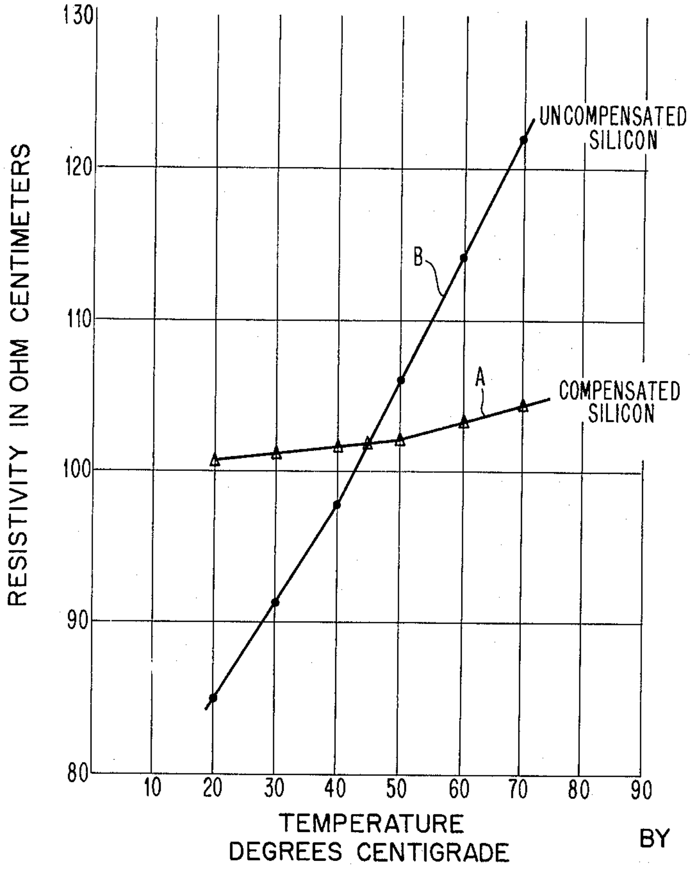
FIG. 3 is a graph showing a comparison of the temperature-independent resistive performance of the material of the invention with normal semiconductor material.

Referring next to FIG. 3, a graph is shown containing two curves illustrating the temperature dependence of resistivity for a specific compensated silicon example, labelled curve "A," and a second curve, labelled "B," illustrative of the variation in resistivity of silicon without the compensating effect achieved in accordance with the invention.

It should be noted, however, that the parameters associated with the conductivity of semiconductor materials, for example, the carrier concentration, the mobility of the carriers, the impurity concentration, the energy gap of the host material, all have a non-linear effect on conductivity, and, that what has been done in accordance with this invention is to set forth a single one of the non-linear criteria influencing conductivity where that one is the major contributor to the change in conductivity and to compensate the effect of the change by that one with another parameter whose departure on the same environmental change causes it to impart a similar but opposite effect.

In accordance with the invention, a density of "deep level" impurity is added to a semiconductor material, such as element 1 in FIG. 1, either in the melt or by subsequent diffusion so that the semiconductor body contains two concentrations $N_1$ and $N_2$ which cooperate to give the desired resistivity and the $N_2$ concentration compensates the mobility decrease by means of an increase in carrier concentration as temperature increases. The added impurity concentration $N_2$ operates to change the total resistivity attainable by the proportion of $N_2$ to $N_1$ but gives no other large side effect.

The necessary quantities of $N_1$ and $N_2$ impurities that are required to compensate mobility change with additional carrier concentration produced by "deep level" impurities may be determined from a calculation of the carrier density and mobility variation with temperature for the material. The basis for these calculations is well-known in the art and specific examples will be provided in later discussion.

The selection of the concentrations of the $N_1$ and $N_2$ impurities required for a resistive impedance of given properties may be made as follows:

Resistance is equal to $$\rho\frac{l}{A}$$

where:

$\rho$=resistivity
$l$=length
$A$=cross-sectional area which would be ($w$) width x ($t$) thickness for a rectangular sample.

Figure 4:
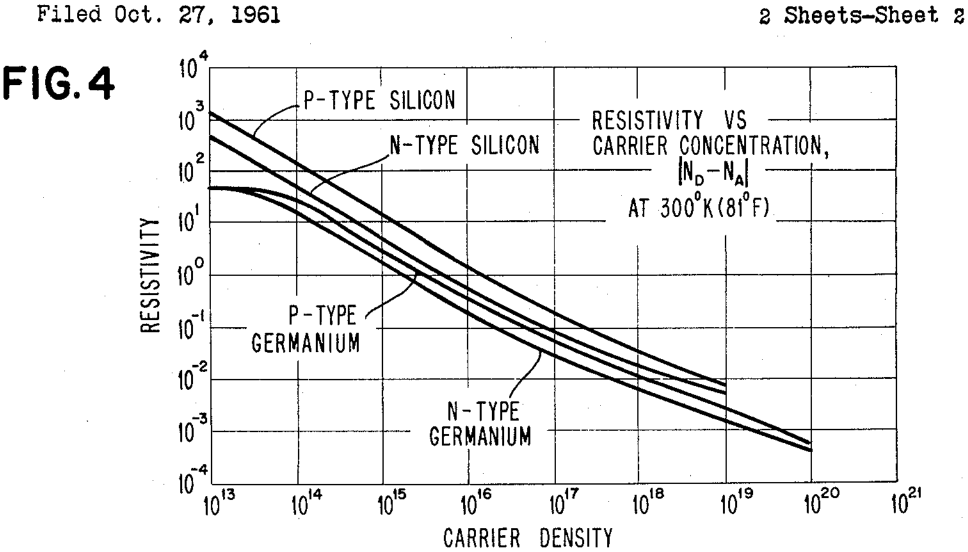
FIG. 4 is a graph of the variation of resistivity of germanium and silicon with carrier density at a given temperature.

With the $l$, $w$, and $t$ dimensions fixed, $\rho$ may be selected to give a desired value of resistance. This is one of the advantages of semiconductor resistors. The resistivity is variable over a wide range so that a large number of resistance values may be achieved in a given size and shape of resistor. This may be clearly seen in comparing the resistivity variation of silicon in the graph of FIG. 4, where there is shown the wide variation of resistivity controllable by carrier concentration at a given temperature for germanium and silicon. Thus with the resistive impedances of the invention, the resistivity term of the resistance equation which had been a constant for each material heretofore in the art now becomes a useful variable.

For a given resistivity the average temperature and the range of temperatures desired will determine first the particular semiconductor material which can be used; for example, germanium, silicon or an intermetallic compound type, and second the limits within which the resistivity can be held. The wider the temperature range the less closely the resistance can be kept constant.

For most practical purposes at the present state of the art, the temperature range will include room temperature which is about 300° Kelvin and some higher and lower temperatures and the examples set forth herein have been selected to illustrate this range; however, it will be apparent to one skilled in the art that the general principles set forth are equally applicable at temperatures beyond the range shown. The highest temperature will determine the maximum possible resistivity for any material. For example, in germanium up to 300° K. (81° F.) the limit would be in the range of 5 ohm centimeters. These numbers are not precise and are used only for illustration. Higher resistivities at a given temperature may be achieved with higher gap width semiconductor materials, such as silicon.

Having selected the semiconductor material and the impurity level $N_1$ to give the desired resistivity in the selected temperature range, stability is next imparted to the resistivity of the semiconductor material as the temperature varies throughout the selected range by compensating the mobility change with a carrier concentration change through the addition of a quantity $N_2$ of "deep level" impurities. In order to do this, we first determine the energy level ($E_f$) of the Fermi level. This determination is made from a combination of expressions for resistivity and carrier density.

EQUATION 1

$$\rho=\frac{1}{ne\mu}$$

where:

$e=1.601\times10^{-19}$ and is the electronic charge in coulombs
$n$=carrier density
$\mu$=mobility Values of mobility are available in the literature for various temperatures and resistivities, an example being Semiconductor Products, July 1960, pages 29 and 30. Equation 1 may be solved for carrier density by rewriting as Equation 2.

EQUATION 2

$$n=\frac{1}{e\mu\rho}$$

The carrier density $n$ is related to the Fermi level energy $E_f$ by the expression:

EQUATION 3

$$n=AT^{3/2}e^{(E_f kT)}$$

where:

The factor $AT^{3/2}$ is the effective density of states in the band edge. The constant coefficient A is known and is:

| | Germanium | Silicon |
|---|---|---|
| "n" type | $2.0\times10^{15}$ | $5.4\times10^{15}$ |
| "p" type | $1.17\times10^{15}$ | $1.95\times10^{15}$ |

$k$=Boltzman's constant $8.617\times10^{-5}$
$T$=temperature in degrees Kelvin.

Equations 1 and 3 may be combined to yield the Fermi level energy as shown in Equation 4.

EQUATION 4

$$E_f=-kT\log_e(\rho e\mu AT^{3/2})$$

In order to compensate for the mobility change with temperature, an impurity energy level is required such that the impurity centers are about half filled at the middle of the temperature range. To satisfy this requirement the Fermi function $f_1$ at mid-range would be equal to ½ and may be expressed as:

EQUATION 5

$$f_1=\frac{1}{2}=\frac{1}{1+(1/g)e^{\frac{E_L-E_f}{kT}}}$$

The Fermi function may be defined as the statistical probability that an energy state will be occupied. where:

$E_L$=the activation energy for the $N_2$ impurity
$g$=a factor known as a degeneracy factor.

Degeneracy of an energy level is a measure of the number of electron states of a given impurity atom having the same energy level. The degeneracy factor is the ratio of the degeneracy of the states of an impurity which has accepted an electron to the degeneracy of the empty center. It is 2 for some shallow impurities and 4 for others. Information on "deep level" impurities to date indicates that it is approximately 0.25 for the 0.26 ev. level of copper in germanium; 0.6 for the 0.31 ev. level of copper and 1.5 for the 0.4 ev. copper level. While not many values of $g$ are available, for purposes of calculation these values are adequate for close approximation. The error involved in not knowing $g$ is $$kT\log_e\frac{1}{g}$$

Since 4 is about the maximum, the error due to ignorance of $g$ will be less than ±0.035 ev.

The Fermi function (Equation 5) may now be solved for the activation energy of the $N_2$ impurity by the use of Equation 4.

EQUATION 6

$$E_L=-kT\log_e\left(\frac{\rho e\mu AT^{3/2}}{g}\right)$$

It will be apparent that the dimensions of the resistive impedance can be varied so that an impurity with an activation energy near the desired level may be used. Where it is desired to vary the dimensions slightly to accommodate a particular $N_2$ impurity, Equation 6 may be expressed as Equation 7.

EQUATION 7

$$E_L=kT\log_e\left(\frac{\mathrm{R\,wt}\,\mu\,\mathrm{AT}^{3/2}}{\mathrm{lg}}\right)$$

where:

R, the desired resistance=

$$\frac{l\rho}{wt}\text{ (for rectangular area)}$$

Figure 5:
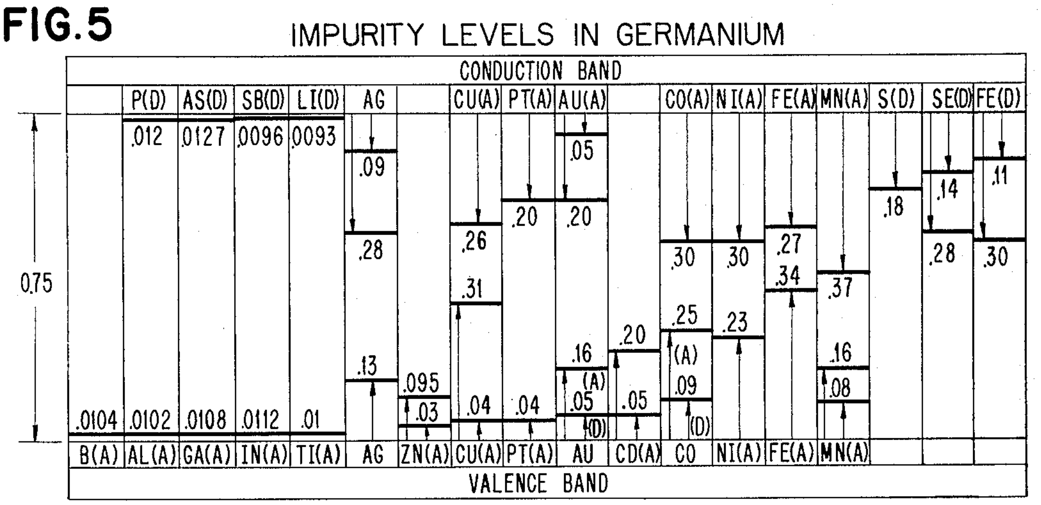
FIGS. 5 and 6 are diagrams of impurity energy levels in germanium and silicon.

Values of $E_L$ are available in the literature for Ag, Zn, Cu, Au, Pt, Cd, Co, Ni, Fe, Mn, Se, Te, in germanium and for In, Zn, Au, Mn, Fe, and Cu in silicon. Values of $E_L$ for germanium and silicon are tabulated in FIGS. 5 and 6. An example of a source of $E_L$ values is an article by E. Burstein and P. H. Egli, "The Physics of Semiconductor Materials", in Advances in Electronics and Electron Physics, Vol. 7, Academic Press, N.Y., 1955. This area is currently receiving study in the art and values of $E_L$ for specific impurities in particular semiconductor materials are frequently being added to the art.

From the discussion thus far, a judicious selection can be made of the semiconductor material, its dimensions and the identity of the $N_1$ and $N_2$ impurities to provide a resistive impedance over a particular temperature range. The doping quantity of $N_2$ impurity needed to achieve the compensation of mobility change will next be considered. It is desirable that the product of the available carriers and the mobility be approximately constant over the temperature range. A determination is made of the change in mobility at the extremes of the temperature range, e.g., from the article in Semiconductor Products, previously referenced. At the higher temperature, mobility will be lower and vice versa.

At the lower mobility value, in order to compensate and keep $\rho$ unchanged, a higher value of $n$ is needed. At the middle of the range $n$ may be established from Equation 2 and this value of $n$ satisfies the Equation 8.

EQUATION 8

$$n=N_D-N_A-fN_L$$

where:

$N_D-N_A$=the net density of shallow donors and acceptors; and, $N_L$=the density of the "deep level" impurity $N_2$, $f$=the Fermi function which was set equal to ½ in Equation 5 so that at the middle of the range:

EQUATION 9

$$n=N_DN_A-\frac{N_L}{2}$$

Considering $n_1$ and $\mu_1$ the values at the mid-point of the range and $n_2$ and $\mu_2$ are the values at the higher temperature extreme a new value $n_2$ for the higher end of the temperature range must equal $$\frac{\mu_1}{\mu_2}n_1$$

The value of the Fermi function $f_1$ at the mid-range was established as ½ in order to elect $E_L$ in Equation 6. The new value of this function for the higher end of the range may be established from Equation 5 using a new value for T and a new value for $E_f$ calculated from Equation 4.

Since:

EQUATION 10

$$n_2=N_D-N_A-f_2N_1=\frac{\mu_1n_1}{\mu_2}$$

and,

EQUATION 11

$$n_1=N_D-N_A-f_1N_L$$

then

EQUATION 12

$$n_2-n_1=(f_1-f_2)N_L$$

and

EQUATION 13

$$n_2-n_1=\left(\frac{\mu_1}{\mu_2}-1\right)n_1$$

so that $N_L$ is thus determined:

EQUATION 14

$$N_L=\frac{(\mu_1-\mu_2)n_1}{(f_1-f_2)\mu_2}=\frac{n_2-n_1}{f_2-f_1}$$

Since $n$ and $N_L$ are now known and $f$=½ at the mid temperature, $N_D-N_A$ which is a measure of the doping level of the $N_1$ impurity can now be determined from Equation 11.

The above determination has been set forth for the condition in which the "deep level" $N_2$ impurity is an acceptor in "n" type semiconductor material or a donor in "p" type semiconductor material. Where the "deep level" $N_2$ impurity is an acceptor in "p" type semiconductor material or a donor in "n" type semiconductor material, the total densit yof the "deep level" impurity must be added to the net density of shallow levels so that $n$ may then be calculated by using in place of Equation 8,

EQUATION 15

$$n=N_D-N_A+N_L-fN_L$$

All of the above equations have been written for "n" type material. For "p" type, the substitution of $p$ for $n$, $N_D$ for $N_A$, $N_A$ for $N_D$ and the measurement of energy levels from the valence band edge instead of the conduction band edge, is performed.

In order to aid one skilled in the art in understanding the invention and to provide a starting place in the practice of a complicated technology, the practice of the invention will be described in detail in connection with the following specific procedure and example.

If 100 ohm centimeters is arbitrarily chosen as the desired resistivity in the temperature range 20° C. to 70° C., at the present state of technology silicon is the only feasible material to use.

In silicon the established values of mobility and density of states which we will need are given by:

| | "n" type | "p" type |
|---|---|---|
| Mobility | $4.0\times10^9\ T^{-2.6}$ | $2.5\times10^8\ T^{-2.3}$ |
| Density of states | $5.4\times10^{15}\ T^{3/2}$ | $1.95\times10^{15}\ T^{3/2}$ |

(T in degrees K.)

For use later in the calculation, the values given by these relations at several values of temperatures are set set forth in Table I following.

*Table I*

| T° C. | T° K. | "n" type | | "p" type | |
|---|---|---|---|---|---|
| | | Mobility | Density of states | Mobility | Density of states |
| 20 | 293 | 1,544 | $2.708\times10^{19}$ | 530 | $9.780\times10^{18}$ |
| 30 | 303 | 1,414 | 2.848 | 491 | $1.0285\times10^{19}$ |
| 40 | 313 | 1,299 | 2.990 | 455 | 1.080 |
| 45 | 318 | 1,247 | 3.062 | 439 | 1.106 |
| 50 | 323 | 1,197 | 3.135 | 423 | 1.132 |
| 60 | 333 | 1,106 | 3.281 | 395 | 1.185 |
| 70 | 343 | 1,024 | 3.430 | 369 | 1.239 |

From Equation 6 in the above discussion, where:

$$E_L = -8.617\times10^{-5}\times318\times2.3026\ \log_{10}\left[10^2\times1.601\times10^{19}\ \frac{\mu A T^{3/2}}{g}\right]$$

$k \quad T \quad \log_e 10 \quad \rho \quad e$ where we have used:

$$(\log_e N = \log_e 10 \log_{10} N)$$

Until the "deep level" impurity is selected $g$ cannot be assigned so unity is initially used. It can be accounted for later by adding $kT \log_e g$ to the value of $E_L$ computed with $g=1$.

The correction $(kT \log_e g) = 0.0274 \log_e g$. It is reasonable to expect in most cases that $g$ will take values such as 4, 2, 1, 0.5, 0.25, etc. When $g$ takes values between 4 and 0.25, the correction term will be between $+0.038$ and $-0.038$. Thus, for "n" type there would be required (depending on the degeneracy factor of the impurity) a level between $-0.327$ and $-0.403$ and for "p" type between $-0.271$ and $-0.347$.

Figure 6:
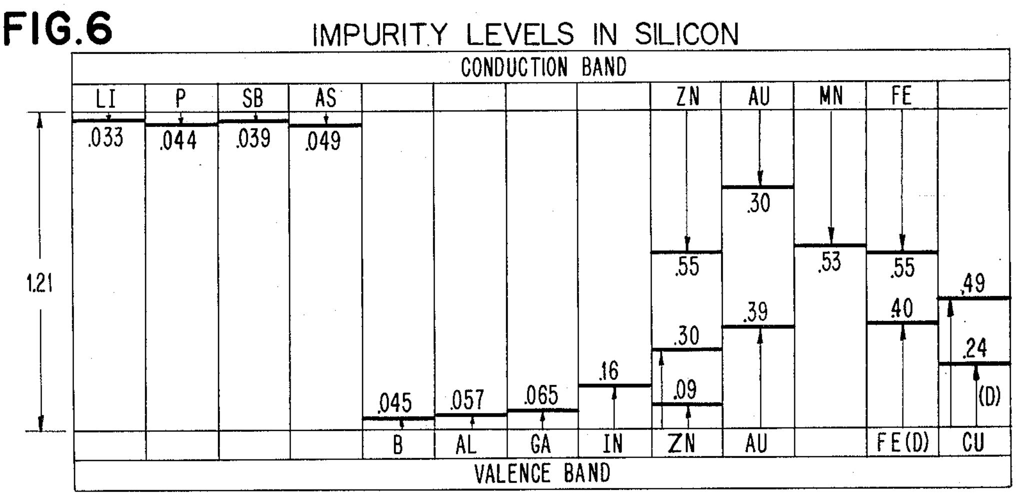

As may be seen in FIG. 6, there is a zinc impurity level in "p" type silicon at $-0.30$ ev. from the valence band edge. This level will serve as the basis for the following calculation.

In addition to illustrating the general procedure, this calculation will include also two complications on the basic procedure described above.

(1) The $-0.3$ ev. zinc level is an acceptor level in "p" type material and will require the substitution described in connection with Equation 15 in place of Equation 8 (and consequent equivalent changes in Equations 9, 10, and 11).

(2) The zinc level probably has and will be assigned a degeneracy factor of 4. As has just been calculated, a degeneracy factor of 4 and 100 ohm centimeters requires an activation energy $E_L = -0.271$ in order to have the level half-filled at 318° K. One of two choices now must be made.

(a) A change in resistivity (to about 80 ohm centimeters) can be accepted to have a half-filled level; or, (b) The filling factor for this level at 100 ohm centimeters can be computed and then the calculation can proceed on that basis.

This latter alternative will lead to somewhat less accuracy in the compensation of the mobility change, but is a more instructive case, so it will be adopted in the following. The filling factor $(f_1)$ may be computed from Equations 4 and 5, using $\rho=100$, and using this value instead of ½ in Equation 9 and subsequent equations.

From solving Equation 4 (compare Equation 6 with $g=1$) $E_f = -0.3086$;

putting this value into Equation 5, $$f_1 = \cfrac{1}{1+\frac{1}{4}e^{\cfrac{-0.3+0.3086}{0.0274}}} = \frac{1}{1+\frac{1.3687}{4}} = \frac{1}{1.34218} = 0.7451$$

from Equation 2, $$n_1 = \frac{1}{10^2\times1.601\times10^{-19}\times439} = 1.423\times10^{14}$$

and, from Equation 10, $$n_2 = \frac{\mu_1}{\mu_2} n_1 = \frac{439}{369} 1.423\times10^{14} = 1.693\times10^{14}$$

at 70° C. (343° K.) from Equation 3, $$E_f = -8.617\times10^{-5}\times343\times2,\ 3026\ \log_{10}\left[\frac{1.239\times10^{19}}{1.693\times10^{14}}\right] \| -0.3311$$

from Equation 5, $$f_2 = \cfrac{1}{1+\frac{1}{4}e^{\cfrac{-0.3+0.3311}{0.02956}}} = \frac{1}{1+\frac{2.864}{4}} = \frac{1}{1.716} = 0.5828$$

These values are now employed in Equation 12.

$$N_L = \frac{n_2-n_1}{f_1-f_2} = \frac{1.693-1.423}{0.7451-0.5828}\times10^{14} = \frac{0.27}{0.1623}10^{14} = 1.664^{14}$$

then, from Equation 15, $$1.423\times10^{14} = N_A - N_D + 1.664\times10^{14} - 0.7451\times1.664\times10^{14} N_A - N_D = 0.999\times10^{14}$$

This establishes:

$N_A - N_D = 10^{14}$ for boron, aluminum, or gallium and $N_L = 1.66\times10^{14}$ for the "deep level" impurity zinc $n$ and $\mu$ may now be computed for several values of T to determine how accurately this doping will maintain $\rho$ constant. Combining Equations 3 and 5, $$f = \frac{n}{n+\frac{AT^{3/2}e^{E_L/kT}}{g}}$$

insert this expression for $f$ in Equation 15 and $$n = N_A - N_D + N_L - \frac{nN_L}{n+\frac{AT^{3/2}e^{E_L/kT}}{g}}$$

multiplying, $$n^2 + n\left[\frac{AT^{3/2}e^{E_L/kT}}{g} - (N_A - N_D)\right] = (N_A - N_D + N_L)\frac{AT^{3/2}e^{E_L/kT}}{g}$$

this is a quadratic, $$n = N_A - N_D - \frac{\frac{AT^{3/2}e^{E_L/kT}}{g}}{2} + \sqrt{\left[\frac{\frac{AT^{3/2}e^{E_L/kT}}{g} - (N_A - N_D)}{2}\right]^2 + (N_A - N_D + N_L)\frac{AT^{3/2}e^{E_L/kT}}{g}}$$

$$n = \frac{10^{14} - N(T)}{2} + \sqrt{\left(\frac{N(T)-10^{14}}{2}\right)^2 + 2.66\times10^{14}N(T)}$$

From Table I the density of states at several temperatures are available. $e^{E_L/kT}$ for these temperatures may now be computed and N(T) and $\rho$ tabulated in Table II.

$$N(T) = \frac{AT^{3/2}e^{E_L/kT}}{g}$$

*Table II*

| T | Density of states g | N(T) | $\rho$ |
|---|---|---|---|
| 293 | $2.445\times10^{18}$ | $1.69\times10^{13}$ | 98.3 |
| 303 | $2.571\times10^{18}$ | $2.63\times10^{-13}$ | 99.2 |
| 313 | $2.70\times10^{18}$ | $3.988\times10^{13}$ | 99.9 |
| 318 | $2.765\times10^{18}$ | $4.854\times10^{13}$ | 100.0 |
| 323 | $2.83\times10^{18}$ | $5.898\times10^{13}$ | 100.1 |
| 333 | $2.963\times10^{18}$ | $8.536\times10^{13}$ | 99.95 |
| 343 | $3.098\times10^{18}$ | $1.2107\times10^{14}$ | 100.05 |

It will be apparent to one skilled in the art that the above example calculation gives an indication of approximate level and identifies the appropriate agent. Such values yield a material the resistivity of which would vary from about 98 ohm centimeters at 20° C. to about 100 ohm centimeters at 70° C. This is a change of, plus or minus, ±2.0% and may be contrasted with, plus or minus, ±20.0% for normal "p" type silicon. These variations are shown in the graph of FIG. 3, as curves A and B, respectively.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A temperature compensated semiconductor resistive impedance member comprising a semiconductive body of a material characterized by having a carrier mobility which varies in a predetermined manner with temperature variation, said body having a temperature dependent carrier concentration change "deep level" impurity material disposed therein, said carrier concentration change varying in a manner opposite to said predetermined manner and being present in sufficient quantity to maintain the resistivity of said body substantially constant over a desired temperature range.

2. A temperature compensated semiconductor resistivity impedance member comprising a body of semiconductive carrier mobility change material having a variation in carrier mobility in a predetermined manner with temperature compensated by having dispersed therein a carrier concentration change semiconductor material providing a variation in thermally generated carriers varying in manner opposite to said predetermined manner with temperature, said last-mentioned material being present in an amount sufficient to maintain the resistivity of said member substantially constant with temperature variation.

3. A temperature compensated semiconductor resistivity impedance member comprising a semiconductive body of a material characterized by having a carrier mobility which varies in a predetermined manner with temperature variation, said body having a temperature dependent carrier concentration change "deep level" impurity material disposed therein, said carrier concentration change varying in a manner opposite to said predetermined manner and being present in sufficient quantity to maintain the resistivity of said body substantially constant over a desired temperature range and at least first and second separated ohmic electrical connections made to said body.

4. The semiconductor device of claim 3 wherein the semiconductor material is silicon.

5. A temperature compensated semiconductor resistivity impedance member comprising in combination: a body of semiconductor material having at least a portion thereof formed of a semiconductor material having a temperature dependent carrier mobility which varies in a predetermined manner with temperature variation, said portion having a temperature dependent carrier concentration change "deep level" impurity material disposed therein the carrier concentration of which varies in a manner opposite to said predetermined manner, said carrier concentration change material being present in sufficient quantity to maintain the resistivity of said portion substantially constant over a desired temperature range and at least first and second separated ohmic electrical contacts connected to said body such that current will flow through at least said portion of said body.

6. A temperature compensated semiconductor resistivity impedance member comprising in combination: a body of monocrystalline semiconductor material having at least a portion thereof formed of a temperature dependent semiconductor material having a carrier mobility change which varies in a predetermined manner with temperature variation, said portion having a temperature dependent carrier concentration change "deep level" impurity material disposed therein the carrier concentration of which varies in a manner opposite to said predetermined manner, said carrier concentration change material being present in sufficient quantity to maintain the resistivity of said portion substantially constant over a desired temperature range and at least first and second separated ohmic electrical contacts connected to said body such that current will flow through at least said portion of said body.

7. The method of providing a uniform resistivity in semiconductor material over a range of temperatures comprising in combination the step of: compensating a semiconductor body of a material having a temperature dependent carrier mobility variation in a predetermined sense with a temperature dependent variation in an opposite sense in carrier concentration from a source of "deep level" impurities disposed in said body.

8. The method of providing a temperature compensated semiconductor resistive impedance comprising in combination the steps of: introducing a first resistivity-value-determining, conductivity-type-determining impurity which varies said resistivity by a change in carrier mobility with temperature in a predetermined manner into a body of semiconductor material, introducing a second "deep level" carrier-concentration-change, conductivity-type-determining impurity into said body which varies said resistivity by a change in carrier concentration with temperature in a manner opposite said predetermined manner in an amount sufficient to maintain said resistivity substantially constant over a selected temperature range, and applying at least first and second separated ohmic electrical contacts to said body.

9. The method of providing a temperature compensated semiconductor resistive impedance comprising in combination the steps of: introducing a first resistivity-value-determining, conductivity-type-determining impurity which varies said resistivity by a change in carrier mobility with temperature in a predetermined manner into a body of silicon semiconductor material, introducing a second "deep level" carrier-concentration-change, conductivity-type-determining impurity into said body which varies said resistivity by a change in a carrier concentration with temperature in a manner opposite said predetermined manner and in an amount sufficient to maintain said resistivity substantially constant over a selected temperature range, and applying at least first and second separated ohmic electrical contacts to said body.

10. A method of providing a temperature compensated semiconductor resistive impedance within a selected temperature range comprising the steps of: providing a body of semiconductor material having a forbidden energy gap sufficiently wide to prevent thermally generated carriers from providing a significant portion of the mechanism of conduction in said selected temperature range, introducing into said semiconductor body a first quantity of a conductivity-type-determining impurity whereby a resistivity which varies due to a carrier mobility change in a predetermined manner with temperature variation is imparted to said body, introducing a second quantity of a "deep level" conductivity-type-determining impurity into said body imparting a resistivity which varies due to carrier concentration change with temperature in a manner opposite to said predetermined manner, said "deep level" impurity having an impurity energy level that is approximately one-half filled at the middle of said selected temperature range, said second quantity being of a magnitude such that the product of the number of available carriers in said semiconductor body and the mobility of said carriers in said semiconductor body is essentially a constant throughout said selected temperature range.

11. The method of providing a temperature compensated semiconductor resistive impedance in a selected temperature range comprising the steps of: providing a body of silicon semiconductor material having a forbidden energy gap sufficiently wide to prevent thermally generated carriers from providing a significant portion of the mechanism of conduction in said selected temperature range, introducing into said silicon semiconductor body a first quantity of a conductivity-type-determining impurity whereby a resistivity which varies due to a carrier mobility change in a predetermined manner with temperature variation is imparted to said body, introducing a second quantity of a "deep level" conductivity-type-determining impurity into said body imparting a resistivity which varies due to a carrier concentration change with temperature in a manner opposite to said predetermined manner, said "deep level" impurity having an impurity energy level that is approximately one-half filled at the middle of said selected temperature range, said second quantity being of a magnitude such that the product of the number of available carriers in said silicon semiconductor body and the mobility of said carriers in said silicon semiconductor body is essentially a constant throughout said selected temperature range.

12. A semiconductor resistor having essentially constant resistivity in the range of from 20° C.–70° C. comprising: a silicon body having dispersed therein approximately $10^{14}$ atoms/cc. of boron and containing also dispersed therein approximately $1.66 \times 10^{14}$ atoms/cc. of zinc.

References Cited by the Examiner

UNITED STATES PATENTS

| | | | |
|---|---|---|---|
| 2,790,037 | 4/1957 | Shockley | 317—239 |
| 2,861,905 | 11/1958 | Indig et al. | 252—62.3 X |
| 2,871,427 | 1/1959 | Tyler et al. | 338—15 X |
| 2,934,685 | 4/1960 | Jones | 317—240 |

RICHARD M. WOOD, *Primary Examiner.*

RAY K. WINDHAM, *Examiner.*

A. BARTIS, H. T. POWELL, *Assistant Examiners.*

UNITED STATES PATENT OFFICE
CERTIFICATE OF CORRECTION

Patent No. 3,248,677 April 26, 1966

Lloyd P. Hunter et al.

It is hereby certified that error appears in the above numbered patent requiring correction and that the said Letters Patent should read as corrected below.

Column 2, line 47, for "intrinsic" read -- extrinsic --; column 2, lines 50 to 54, the equation should appear as shown below instead of as in the patent:

$$1/\left[1+e^{\left(\frac{E_D-E_f}{kT}\right)}\right]$$

column 6, line 4, the equation should appear as shown below instead of as in the patent:

$$n=AT^{3/2}e^{(E_f/kT)}$$

column 7, lines 48 to 50, the equation should appear as shown below instead of as in the patent:

$$N=N_D-N_A-\frac{N_L}{2}$$

column 7, line 59, for "elect" read -- select --; column 8, line 24, for "densit yof" read -- density of --; column 9, line 10, the equation should appear as shown below instead of as in the patent:

$$\log_e N=\log_e 10 \times \log_{10} N.$$

lines 60 to 64, the equation should appear as shown below instead of as in the patent:

$$f_1=\left[1+1/4e^{\left(\frac{-.3+.3086}{.0274}\right)}\right]^{-1}=\frac{1}{1+\frac{1.3687}{4}}=0.7451$$

column 10, lines 9 and 10, the equation should appear as shown below instead of as in the patent:

$$E_f=-8.617\times10^{-5}\times343\times2.3026\ \log_{10}\left[\frac{1.239\times10^{19}}{1.693\times10^{14}}\right]=-0.3311$$

lines 12 to 16, the equation should appear as shown below instead of as in the patent:

$$f_2=\left[1+1/4e^{\left(\frac{-.3+.3311}{.02956}\right)}\right]^{-1}=\frac{1}{1+\frac{2.864}{4}}=0.5828$$

line 20, the equation should appear as shown below instead of as in the patent:

$$N_L=\frac{n_2-n_1}{f_1-f_2}=\frac{1.693-1.423}{0.7451-0.5828}\times10^{14}=1.664\times10^{14}$$

Signed and sealed this 21st day of November 1967.

(SEAL)
Attest:

EDWARD M.FLETCHER,JR.
Attesting Officer

EDWARD J. BRENNER
Commissioner of Patents